3,238,133
LUBRICATING OIL COMPOSITIONS CONTAINING NEUTRAL ASHLESS POLYMERIC DETERGENTS

Lyman E. Lorensen, Orinda, Calif., assignor to Shell Oil Company, New York, N.Y., a corporation of Delaware
No Drawing. Filed July 30, 1962, Ser. No. 213,163
10 Claims. (Cl. 252—56)

This invention relates to improved hydrocarbon lubricants, and particularly to mineral lubricating oil compositions which possess good detergent-dispersant and other desired lubricating properties.

It is known that certain metal salts such as metal petroleum sulfonates, naphthenates and the like can be used as detergent or dispersants for lubricating oil compositions. Because of their tendency to form ash, these materials have been replaced in part or totally by non-ash forming compounds. These non-ash forming compounds are generally polymeric compounds containing polar groups such as hydroxyl or substituted nitrogen groups in which the nitrogen-containing groups are imido, amino or amido groups derived from polymerizable nitrogen-containing compounds such as vinylpyridines, vinylpyrrolidones, amino-containing acrylates or the like. Due to the basic nature of such polymers they tend to react with other additives which are normally present in lubricating oil compositions or with oil decomposition products and can result in sludge and varnish formation. Similar objections apply to acidic dispersant polymers.

It has now been discovered that an excellent neutral non-ash forming polymeric detergent and dispersant for lubricating oil compositions can be provided by addition to such lubricating oil compositions (0.1% to 10% by wt.) of a new and novel neutral polymeric methacrylate ester derived from primary straight chain alcohols at least one of which has from 30 to 50, preferably from 34 to 44 carbon atoms, the polymer having a molecular weight range of from about 50,000 to about 2,000,000, preferably from about 100,000 to about 850,000 as determined by the light scattering method. These polymeric alkyl methacrylates containing $C_{30-50}$ methacrylate groups possess excellent detergent dispersant properties as well as viscosity index improving properties with the higher molecular weight preparation and can be used per se or copolymerized with from about 20% to 40% of the conventional $C_{4-20}$ alkyl methacrylate monomer mixture present in polymer form in products known under the trade name of Acryloid 150, 618, 710 and described in U.S. Patents 2,091,627, 2,604,453, 2,655,479, 2,859,450 and 2,992,987. Other lower alkyl methacrylates such as tridecyl methacrylate may be copolymerized with the $C_{30}$–$C_{50}$ methacrylate mixture. The copolymers of $C_{30-50}$ alkyl methacrylates also possess excellent detergent and dispersing as well as viscosity index improving, and pour point depressing properties.

As stated previously polymeric esters of alkanols having at least 30 carbon atoms or copolymers of such $C_{30-50}$ alkyl methacrylate esters and $C_{4-20}$ alkyl methacrylates in which the former is in predominant amounts possess detergent and dispersant properties. Prior to this discovery the alkyl chain length of such esters did not appear critical with respect to other lubricating oil requirements such as viscosity index improvement and pour point depressant properties which these polymers are known to possess. This is clearly emphasized in U.S. Patent 2,992,987, namely that polymethacrylate esters as viscosity index improvers are normally made with alcohols having at least 8 carbon atoms and not more than 24 carbon atoms and more preferably not more than 18 carbon atoms. Thus, the discovery that $C_{30-50}$ alkyl methacrylate polymers lacking, nitrogen, hydroxyl, etc. polar groups results in products possessing detergent-dispersant properties is unusual and unexpected.

The long chain alcohols having from 30 to 50 or more carbon atoms used to form the methacrylate monomers which in turn are used to form the detergent polymers of this invention are of the class available under the trade name of "Alfol" alcohols and their means of preparation is described in Chemistry and Engineering News of May 28, 1962. The $C_{30-50}$ alkyl methacrylates, preferably $C_{34-44}$ alkyl methacrylates monomers are polymerized (or copolymerized) by conventional means such as described in the Bruson's patent, U.S. 2,091,627, Munday's patent, U.S. 2,655,479, Heisig's patent, U.S. 2,710,842 or Galindo's patent, U.S. 2,850,450. Specific examples of detergent-dispersant polymers include: (1) $C_{34-44}$ alkyl methacrylate, (2) $C_{30}$ alkyl methacrylate, (3) $C_{34}$ alkyl methacrylate, (4) $C_{36}$ alkyl methacrylate, (5) $C_{38}$ alkyl methacrylate, (6) $C_{40}$ alkyl methacrylate, (7) $C_{42}$ methacrylate, (8) $C_{44}$ alkyl methacrylate, (9) $C_{48}$ alkyl methacrylate, (10) $C_{50}$ alkyl methacrylate, (11) copolymer of 80% $C_{40}$ alkyl methacrylate and 20% of lauryl and stearyl methacrylate (1:1), (12) copolymer of 60% $C_{40}$ alkyl methacrylate and 40% lauryl and stearyl methacrylate, (13) copolymer of 60% $C_{34-44}$ alkyl methacrylate and 40% (lauryl and stearyl methacrylate monomer mixture), (14) copolymer of 80% $C_{34-44}$ alkyl methacrylate and 20% octyl, cetyl, and lauryl methacrylate monomer mixture, (15) copolymer of 80% $C_{30-40}$ alkyl methacrylate and 20% lauryl and stearyl methacrylate monomer mixture. The molecular weight of polymers 1–15 ranges between 600,000 and 1,000,000. The commercial methacrylate ester polymers such as "Acryloid 150, 618 or 710" the monomer mixture of which can be used to form copolymers with $C_{30-50}$ alkyl methacrylates of the present invention as noted above are mixtures of $C_{4-20}$ alkyl methacrylates. In the case of "Acryloid 150" sold by Rohm & Haas, it is predominantly a methacrylate copolymer ester of a mixture of cetyl, lauryl and octyl alkanols and the molecular weight of the polymer is about 600,000 (light scattering method). Another commercial methacrylate copolymer of this is sold under the trade name of "Acryloid 710" by Rohm & Haas, and the alkanols are predominantly a mixture of lauryl and octyl alkanols, and the molecular weight is about 500,000.

Detergent - dispersant polymeric $C_{30-50}$ alkyl methacrylates of the present invention are neutral oil-soluble polymeric materials which are normally used in concentrations of from 0.1% to 10% by weight in lubricating oils. Because of their neutrality they exhibit marked advantages over polar-containing non - ash detergent polymers such as the nitrogen-containing polymers available commercially as Du Pont's "LOA-564 or 565", Rohm & Haas "Acryloid 917 or 966" which are copolymers of vinylpyrrolidone and lauryl methacrylate or Oronite's 1200 additive series, e.g. "OLOA 1200" which are imides of polyolefin succinic anhydride, or copolymer of 2-methyl-5-vinylpyridine and mixture of lauryl and stearyl methacrylate having a molecular weight of around 600,000–850,000, or acidic polymers similar to Esso's "Paratone 430 or 460," consisting of terpolymers of $C_{8-20}$ alkyl acrylates or fumarates with vinyl esters and polymerizable mono or dicarboxylic organic acids or anhydrides, such as acrylic acid, methacrylic acid, citraconic acid, itaconic acid, maleic acid, fumaric acid, maleic anhydride or other types of polymerizable acidic compounds. Examples of such acidic polymeric detergent are: ($I_1$) a copolymer of vinyl acetate, maleic anhydride and mixture of n-hexadecyl and n-octadecyl fumarates prepared under conditions described in French Patent 1,228,353; ($II_1$) an acidic detergent polymer of an ethoxylated partial ester of $C_{9-18}$ alkyl maleate and vinyl acetate prepared by reacting partial ester of $C_{9-18}$ alkyl maleate (acid No. 90) with ethylene oxide in presence of benzoyl peroxide at around 70° C. for about an hour.

Other additives which can be used in combination with the essential polymeric additive of this invention are alkylated bisphenol antioxidant having the formula:

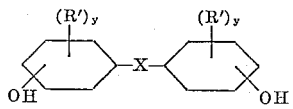

wherein R' is a hydrocarbyl radical, preferably a $C_{1-8}$ alkyl radical, y is an integer of 1 to 4, preferably 1 or 2, X stands for —S—, —S—S—, Se, —S—CH$_2$—, —CH$_2$—S+CH$_2$—, —CHR—, CR$_2$—, —(CH$_2$)$_m$—, —NH—, —O—, and wherein R stands for methyl or ethyl and m stands for an integer from 1 to 3. The preferred alkylated bisphenols are those having a sulfur bridge or a methylene bridge.

The alkylated bisphenols may contain from 1 to 8 alkyl groups, but preferably they contain from 2 to 6 alkyl groups. Alkylated bisphenols having 4 alkyl groups are particularly preferred. Each of the alkyl groups may contain from 1 to 10 carbon atoms, preferably 2 to 6 carbon atoms and especially 4 carbon atoms. Furthermore, the alkyl groups contained by any particular bisphenol may be the same or different and may also be primary, secondary or tertiary alkyl groups. Bisphenols containing at least one tertiary alkyl group are particularly preferred.

As examples of the alkylated bisphenols which may be used according to the invention there are mentioned bis(3 - ethyl - 4 - hydroxyphenyl)disulfide, bis(3 - methyl-4 - propyl - 5 - hydroxyphenyl)disulfide, bis(2 - isopropyl-3 - butyl - 5 - hydroxyphenyl)selenide, 2:2' - diethyl-3-tertiary butyl - 4.4' - dihydroxy diphenyl selenide, bis-1.2-(2:6 - ditertiary butyl - 4 - hydroxyphenyl)thiaethane, bis-1.2 - (2:5 - diisopropyl - 3 - hydroxyphenyl)thiaethane, bis(3:5 - di - tertiary butyl - 4 - hydroxyphenyl)sulfide, 2:4 - di - isobutyl - 3 - hydroxybenzyl - 2':4' - dipropyl - 3' - hydroxy-benzyl sulfide, bis - 1.2-(2 - octyl-5 - tertiary butyl - 4 - hydroxyphenyl)ethane, bis - 1.1-(2:6 - di-isopropyl - 4 - hydroxyphenyl)ethane, 1.2-bis-(2:4 - di-tertiary pentyl - 3 - hydroxyphenyl)propane, bis - 2.2 - (4:5 - di-tertiary butyl - 2 - hydroxyphenyl)-propane, bis(2 - tertiary butyl - 5 - isopentyl - 4 - hydroxyphenyl)amine, bis(3:5-dibutyl - 4 - hydroxy-phenyl)ether, bis(2:6-dipropyl - 4 - hydroxyphenyl)ether. Examples of alkylated bis-phenols having a sulfur bridge are bis(2:5 - dipentyl-4-hydroxyphenyl)sulfide, bis(2:5-dihexyl - 3 - hydroxyphenyl)sulfide, bis(2-methyl 5-tertiary butyl - 4 - hydroxyphenyl)sulfide, bis(2-methyl-5-tertiary butyl-6-hydroxyphenyl)sulfide and particularly bis(3-tertiary butyl-5-methyl-2-hydroxyphenyl)sulfide. Example of alkylated bisphenols having a methylene bridge are bis-(2:3 - di-tertiary butyl - 4 - hydroxyphenyl)methane, bis-(2:5 - di-tertiary butyl - 4 - hydroxyphenyl)methane, bis(2:6 - di-tertiary butyl - 4 - hydroxyphenyl)methane, bis(3:5 - di-tertiary octyl - 4 - hydroxyphenyl)methane, bis(3-tertiary butyl - 5 - tertiary octyl - 4 - hydroxyphenyl)methane, and especially bis(3:5 - di - tertiary butyl - 4 - hydroxyphenyl)methane, (3,5 - ditert-butyl-3',5' - di - methyl - 4:4' - dihydroxydiphenyl)methane, (3,5 - ditert - butyl - 3',5' - diisopropyl - 4:4' - dihydroxydiphenyl)methane (3,5,3',5' - ditertbutyl - 2,4' - dihydroxydiphenyl)methane.

The alkylated bisphenol may be prepared by any of the methods known in the art of bisphenol manufacture, for example, by selecting the appropriate alkylated phenols as starting materials and condensing them together by any of the established methods.

The bisphenols may be used in amounts of from 0.1% to 5% preferably from 0.5% to 1% by weight.

The lubricating oil compositions according to the invention can be used in combination with small amounts of other additives which are extreme pressure organic phosphorus-containing compounds such as alkyl, cycloalkyl, alkaryl, aralkyl, and aryl phosphites, phosphates phosphonates, and their thio-derivatives, such as $C_{3-18}$ alkyl phosphites, e.g. di and tributyl, octyl, lauryl, stearyl, cyclohexyl, benzyl, cresyl, phenyl phosphites or phosphates, as well as their thio-derivatives; $P_2S_5$-terpene reaction product; metal thio-phosphates, e.g. calcium, zinc, lead, aluminum, dialkyl dithiophosphates; organo phosphonates e.g. dibutyl methanephosphonate, dibutyl trichloromethanephosphonate, dibutyl monochloromethanephosphonate, dibutyl chlorobenzenephosphonate, dibutyl monochloromethanephosphonate, dibutyl chlorobenzenephosphonate and the like. The esters of pentavalent phosphorus acids such as diphenyl, dicresyl, triphenyl, tricresyl, trilauryl and tristearyl phosphate, $P_2S_5$-terpene reaction products and mixtures thereof are preferred.

The phosphorus compounds may be used in amounts of from 0.1% to 5%, preferably from 0.1% to 1% by weight.

Lubricating oils which can be used as base oils for the lubricating oil compositions according to the invention include a wide variety of lubricating oils such as naphthenic base, paraffin base, and mixed base lubricating oils, other hydrocarbon lubricants, e.g. lubricating oils derived from coal products, and synthetic oils, e.g. ethyl alcohol, dicarboxylic acid esters (e.g. those which are prepared by esterifying such dicarboxylic acids as adipic acid, azelaic acid, suberic acid, sebacic acid, succinic acid, fumaric acid, maleic acid, pimelic acid etc., with alcohols, such as butyl alcohol, hexyl alcohol, 2-ethylhexyl alcohol, dodecyl alcohol, etc.) liquid esters of acids of phosphorus, alkyl benzenes, polyphenyls (e.g. biphenyls and terphenyls), alkyl biphenyl ethers, polymers of silicon (e.g. tetraethyl silicate, tetra-isopropyl silicates, tetra(4-methyl-2 - tetraethyl)silicate, hexyl - (4 - methyl - 2 - pentoxy)-disiloxane, poly(methyl)siloxane, and poly(methylphenyl)siloxane. These base oils may be used individually or in combinations.

The following non-ash lubricating compositions are representative of the invention.

|  | Percent |
|---|---|
| Composition A: | |
|   Example 1 polymeric additive | 2 |
|   Mineral lubricating oil (SAE 20) | Balance |
| Composition B: | |
|   Example 6 polymeric additive | 2 |
|   Mineral lubricating oil (SAE 20) | Balance |
| Composition C: | |
|   Example 13 copolymeric additive | 2 |
|   Mineral lubricating oil (SAE 20) | Balance |
| Composition D: | |
|   Example 1 additive mixture | 2 |
|   Bis(3,5-ditert-butyl-4-hydroxyphenyl)methane | 0.75 |
|   Mineral lubricating oil (SAE 20W–30) | Balance |
| Composition E: | |
|   Example 13 copolymeric additive | 2 |
|   Bis(3,5-ditert-butyl-4-hydroxyphenyl)methane | 0.75 |
|   Tricresylphosphate | 0.5 |
|   Mineral lubricating oil (SAE 20) | Balance |
| Composition F: | |
|   Example 6 polymeric additive | 1 |
|   Bis(3,5-ditert-butyl-4-hydroxyphenyl)methane | 0.75 |
|   Tricresylphosphate | 0.5 |
|   Mineral lubricating oil (SAE 20) | Balance |
| Composition G: | |
|   Example 1 polymeric additive | 1.5 |
|   Bis(3,5-ditert-butyl-4-hydroxyphenyl)methane | 0.75 |
|   Tricresylphosphate | 0.5 |
|   Mineral lubricating oil (SAE 20) | Balance |

Composition H:

| | Percent |
|---|---|
| Example 13 copolymeric additive | 2 |
| Bis(3,5-ditert-butyl-4-hydroxyphenyl)methane | 0.75 |
| Tricresylphosphate | 0.80 |
| Dicresylphosphate | 0.40 |
| Mineral lubricating oil (SAE 10W-30) | Balance |

Compositions of this invention were tested for their detergency and dispersancy properties by adding 0.02% carbon black to a test composition and suspending into said test oil at both ambient temperature and at 110° C. a strip of filter paper of set dimensions and observing the height and intensity of the carbon band formed on the filter paper. Compositions A, B, C, D, E and H exhibited at both temperatures detergency effectiveness of 2 to 3 times that of compositions containing conventional $C_{4-20}$ alkyl methacrylate polymers such as "Acryloid 150, 618 or 710" and specifically such as compositions:

Compositions X=mineral oil+2% "Acryloid 618" copolymer,
Compositions Y=mineral oil+2% "Acryloid 150" copolymer,
Compositions Z=mineral oil+2% "Acryloid 710" copolymer,
Compositions XX=mineral oil+2% 2-methyl-5 vinylpyridine/lauryl methacrylate/stearyl methacrylate,
Compositions YY=mineral oil+2% "Paratone 430" copolymer,
Compositions ZZ=mineral oil+2% "Paratone 460" copolymer.

Also in engine tests such as the LS-3 Cadillac engine test modified as follows: 100 hours, 400 repeating cycles of 15 minutes each, comprising 1 minute at 90° F. jacket temperature, 10 minutes at 135° F. jacket temperature, 2500 r.p.m. and 4 minutes at 190° F. jacket temperature at 3200 r.p.m.; operated on high sulfur fuel, compositions A, C, D and H passed the 100 hour test and prevented oil ring-plugging, left oil rings clean and the engine was in excellent condition whereas compositions X, Y, Z and XX failed within 50–75 hours, especially with respect to ring-plugging.

Other additives may also be incorporated into the lubricating composition according to the invention, for example anti-scuffing agents; anti-foaming agents, e.g. silicone polymers; viscosity index improvers, extreme pressure additive such as; dibenzyl disulfide, rust inhibitors, such as sorbitan monoleate or butyl stearate; oiliness agents, such as acidless tallow, oleic acid and the like.

I claim as my invention:

1. A lubricating oil composition consisting essentially of a major amount of lubricating oil and from about 0.1% to about 10% of a detergent-dispersant oil-soluble $C_{30-50}$ alkyl methacrylate polymer having a molecular weight of from about 50,000 to about 2,000,000.

2. A lubricating oil composition consisting essentially of a major amount of mineral lubricating oil and from about 0.1% to about 10% of a detergent-dispersant oil-soluble $C_{34-44}$ alkyl methacrylate polymer having a molecular weight of from about 100,000 to about 850,000.

3. A lubricating oil composition consisting essentially of a major amount of mineral lubricating oil and from about 0.1% to about 10% of a detergent-dispersant oil-soluble $C_{40}$ alkyl methacrylate polymer having a molecular weight of from about 100,000 to about 850,000.

4. A lubricating oil composition consisting essentially of a major amount of mineral lubricating oil and from about 0.1% to about 10% of a detergent-dispersant oil-soluble copolymer of 60–80% $C_{34-44}$ alkyl methacrylate and 20–40% $C_{4-20}$ alkyl methacrylate, having a molecular weight of from about 100,000 to about 850,000.

5. A lubricating oil composition consisting essentially of a major amount of mineral lubricating oil and from about 0.1% to about 10% of a detergent-dispersant oil-soluble copolymer of 60–80% $C_{34-44}$ alkyl methacrylate and 20–40% of a mixture of lauryl and stearyl methacrylates, the copolymer having a molecular weight of from about 100,000 to about 850,000.

6. A lubricating oil composition consisting essentially of a major amount of mineral lubricating oil and from about 0.1% to about 10% of a detergent-dispersant oil-soluble copolymer of $C_{40}$ alkyl methacrylate (60–80%) and a mixture of lauryl and stearyl methacrylates (20–40%), the copolymer having a molecular weight of from about 100,000 to about 850,000.

7. As a new polymer the polymer of $C_{30-50}$ alkyl methacrylate having a molecular weight of from about 100,000 to about 2,000,000, said polymer being useful as an oil additive.

8. As a new polymer the polymer of $C_{34-44}$ alkyl methacrylate having a molecular weight of from about 100,000 to about 2,000,000, said polymer being useful as an oil additive.

9. As a new polymer the copolymer of 60–80% $C_{34-44}$ alkyl methacrylate and 20–40% $C_{4-20}$ alkyl methacrylate having a molecular weight of from about 100,000 to about 850,000, said polymer being useful as an oil additive.

10. As a new polymer the copolymer of 60–80% of $C_{34-44}$ alkyl methacrylate and 20–40% mixture of lauryl and stearyl methacrylates, the copolymer having a molecular weight of from about 100,000 to about 850,000, said polymer being useful as an oil additive.

References Cited by the Examiner

UNITED STATES PATENTS

| | | | |
|---|---|---|---|
| 2,400,106 | 5/1946 | Denison et al. | 252—33.6 |
| 2,479,948 | 8/1949 | Luten | 252—407 X |
| 2,655,479 | 10/1953 | Munday | 260—86.1 X |
| 2,691,632 | 10/1954 | Harle | 252—47 |
| 2,785,188 | 3/1957 | Coe | 252—52 X |
| 2,807,653 | 9/1957 | Filbey et al. | |
| 2,912,418 | 11/1959 | Johnson et al. | 260—86.1 |
| 2,921,029 | 1/1960 | Gleason et al. | 252—49.8 |
| 2,980,658 | 4/1961 | Ham | 260—86.1 |
| 2,992,987 | 7/1961 | Fields | 252—56 |
| 2,994,663 | 8/1961 | Lowe et al. | 252—56 |
| 3,082,188 | 3/1963 | Dietzler | 260—45.95 |
| 3,103,501 | 9/1963 | Shearer | 260—45.95 |

FOREIGN PATENTS 661,554    4/1963    Canada.

OTHER REFERENCES

Kalichevsky: Petroleum Refining With Chemicals, 1956, Elsevier Publishing Company, New York, p. 499 relied upon.

DANIEL E. WYMAN, *Primary Examiner.*

JULIUS GREENWALD, *Examiner.*